Jan. 3, 1939.　　W. J. F. FORWARD　　2,142,439
MACHINE TOOL
Filed Aug. 20, 1937　　8 Sheets-Sheet 1

INVENTOR.
Worthy J. F. Forward
BY Harold E. Stonebraker
his ATTORNEY.

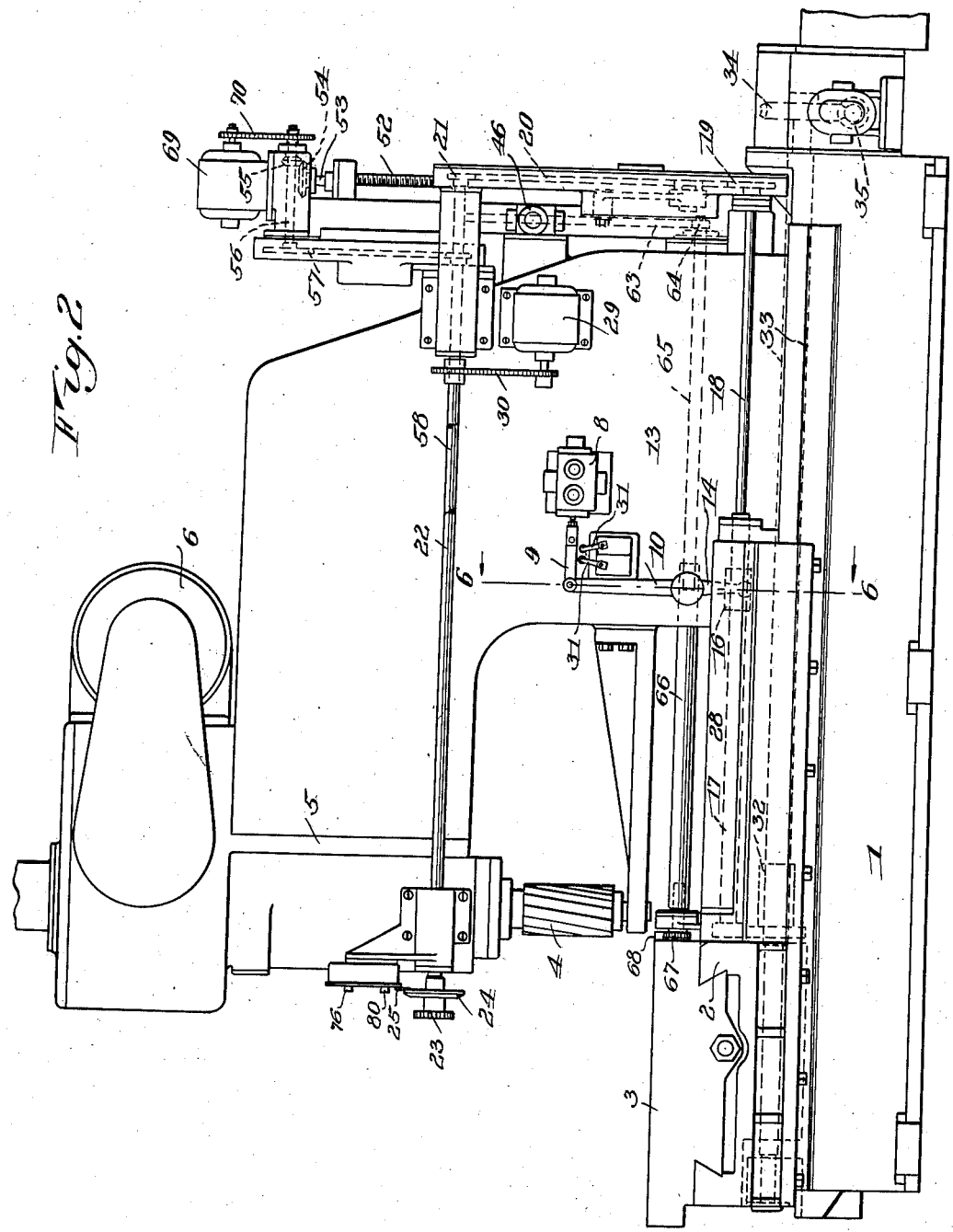

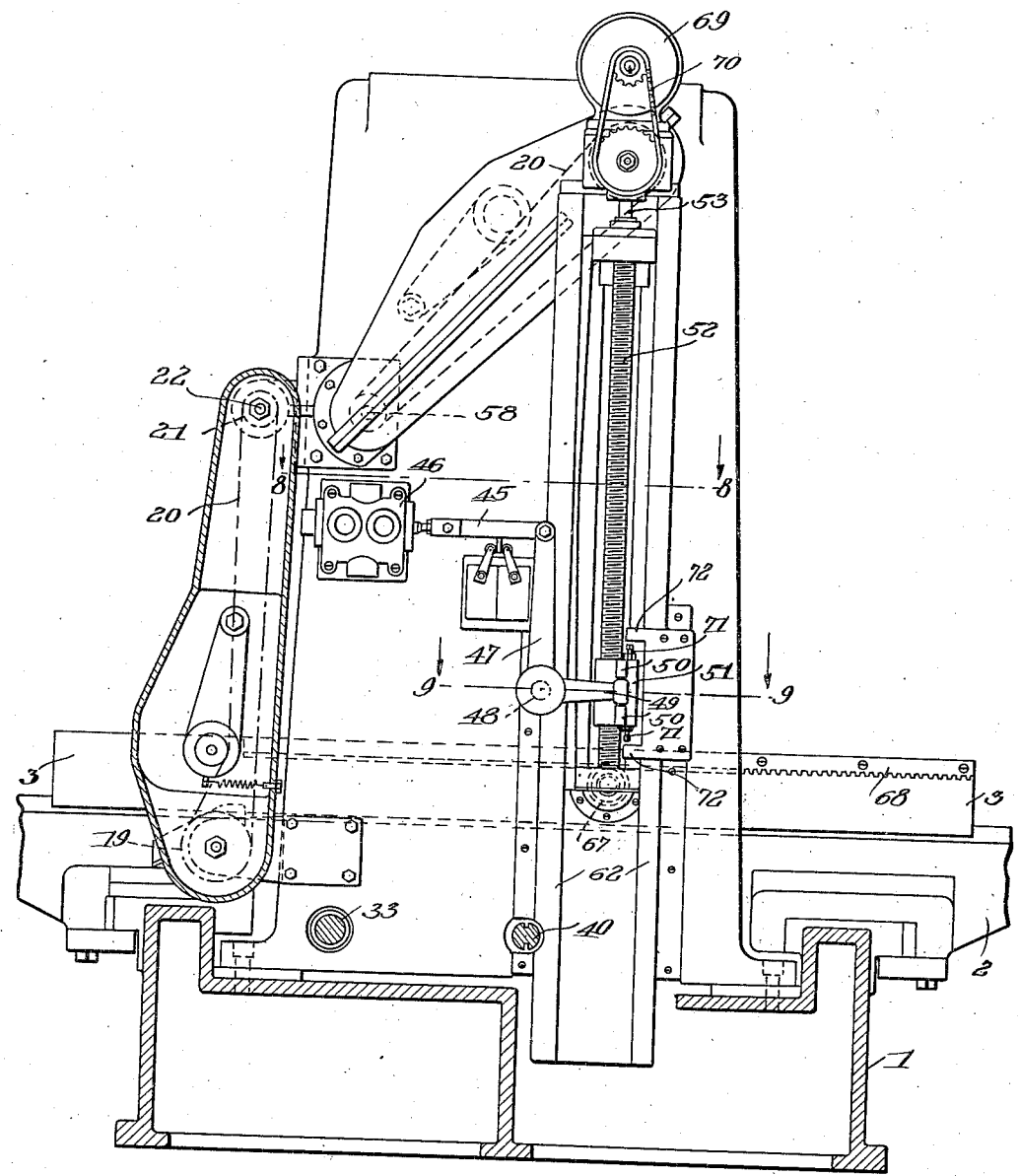

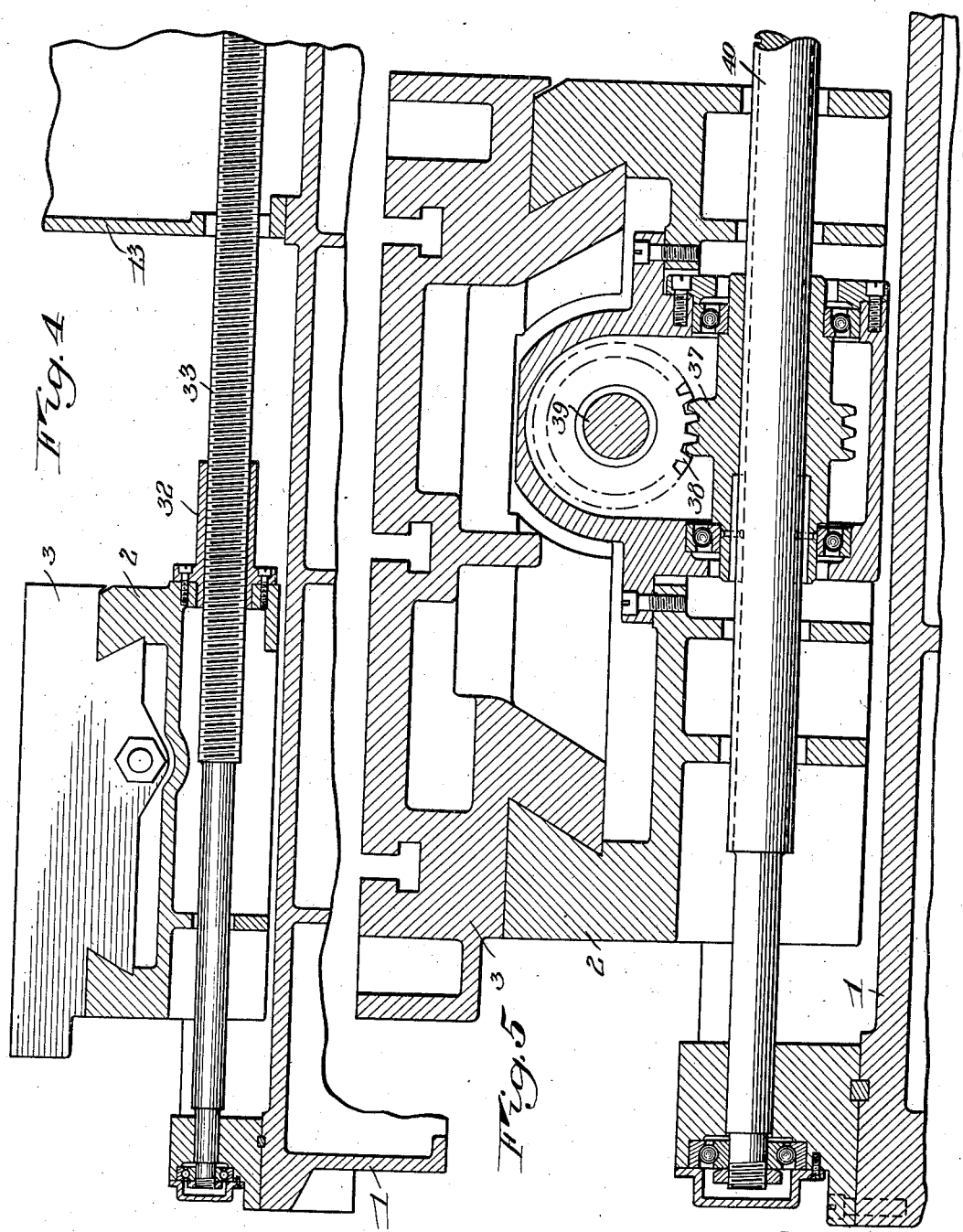

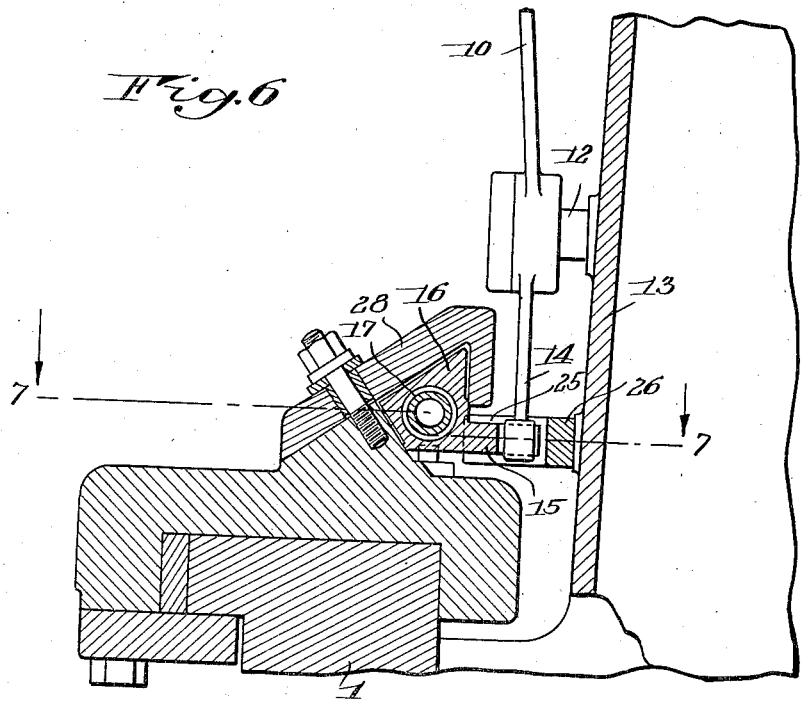
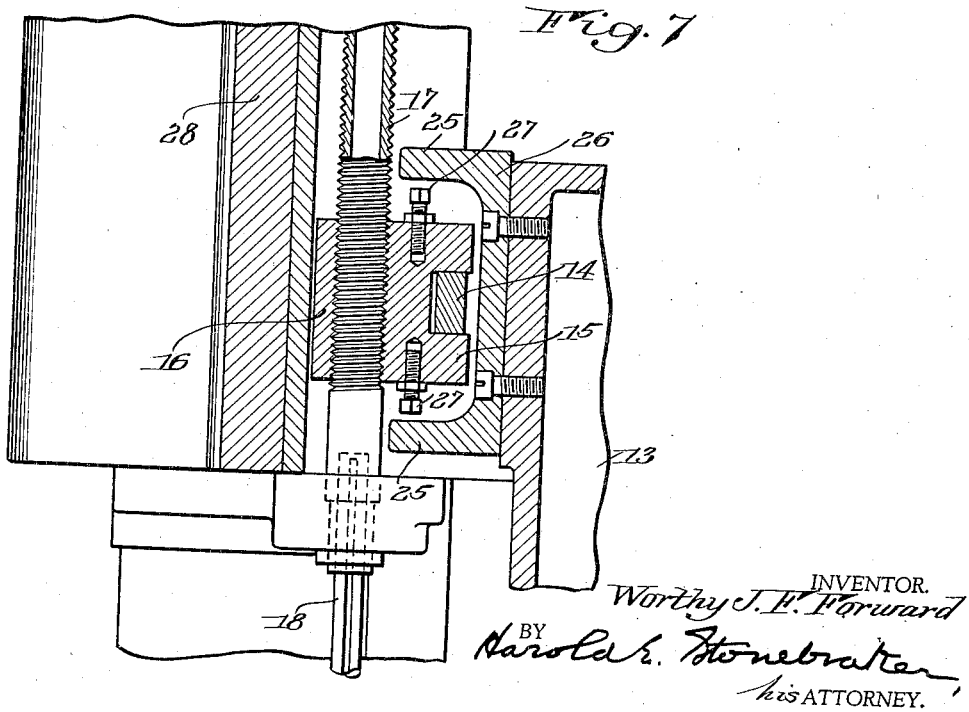

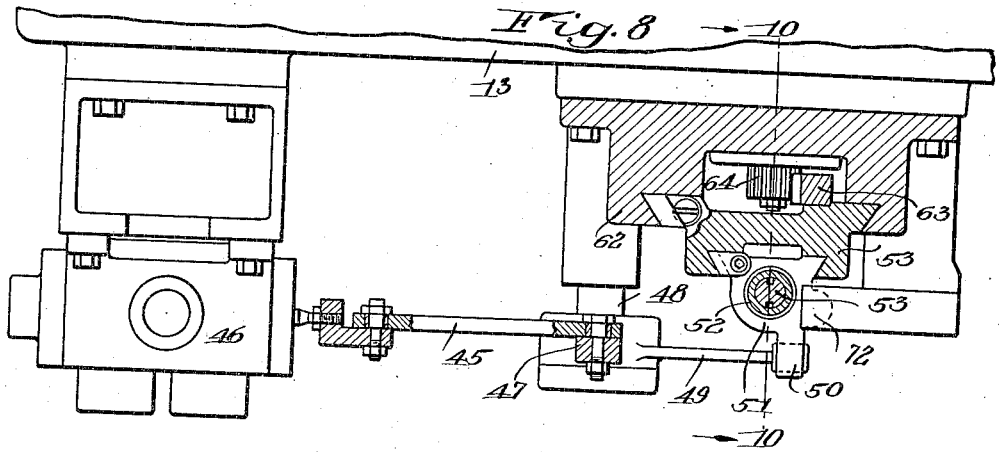
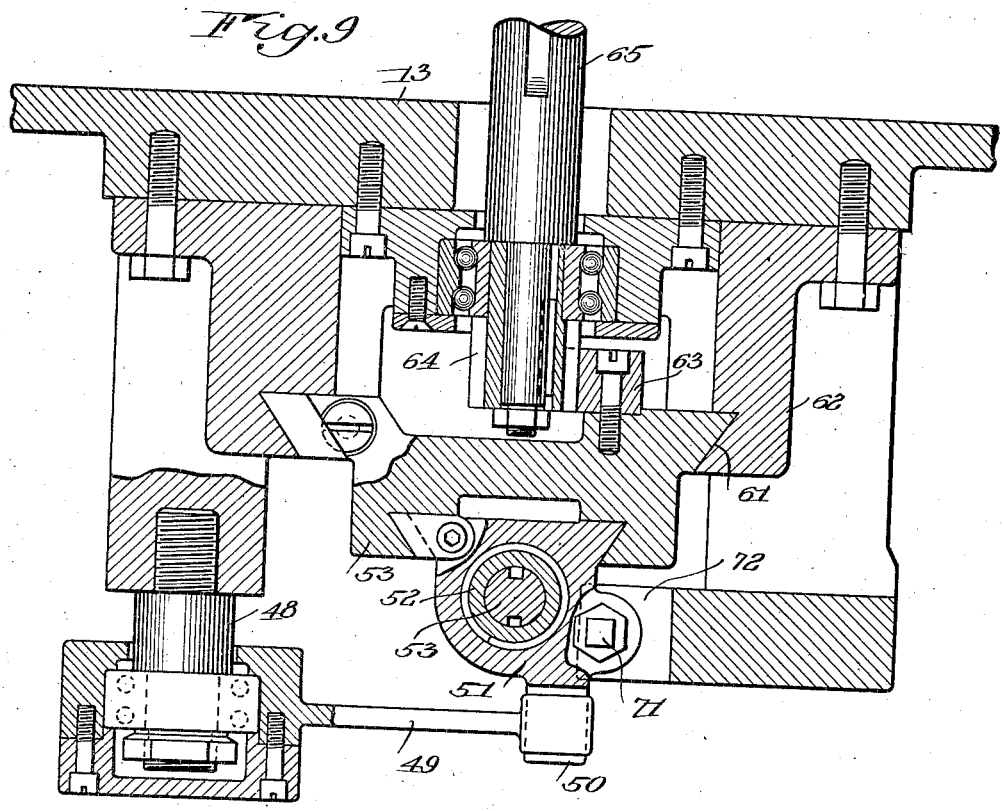

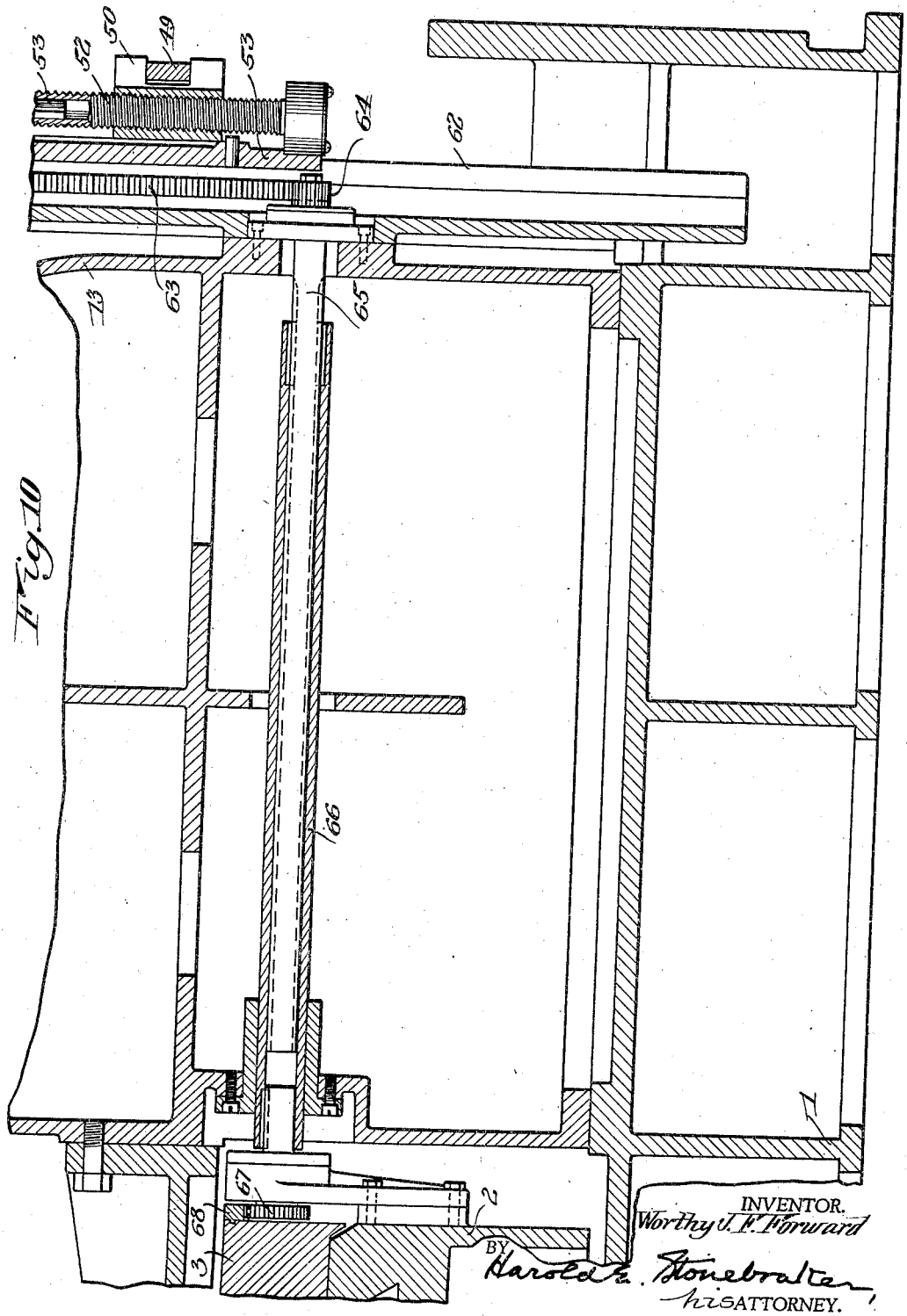

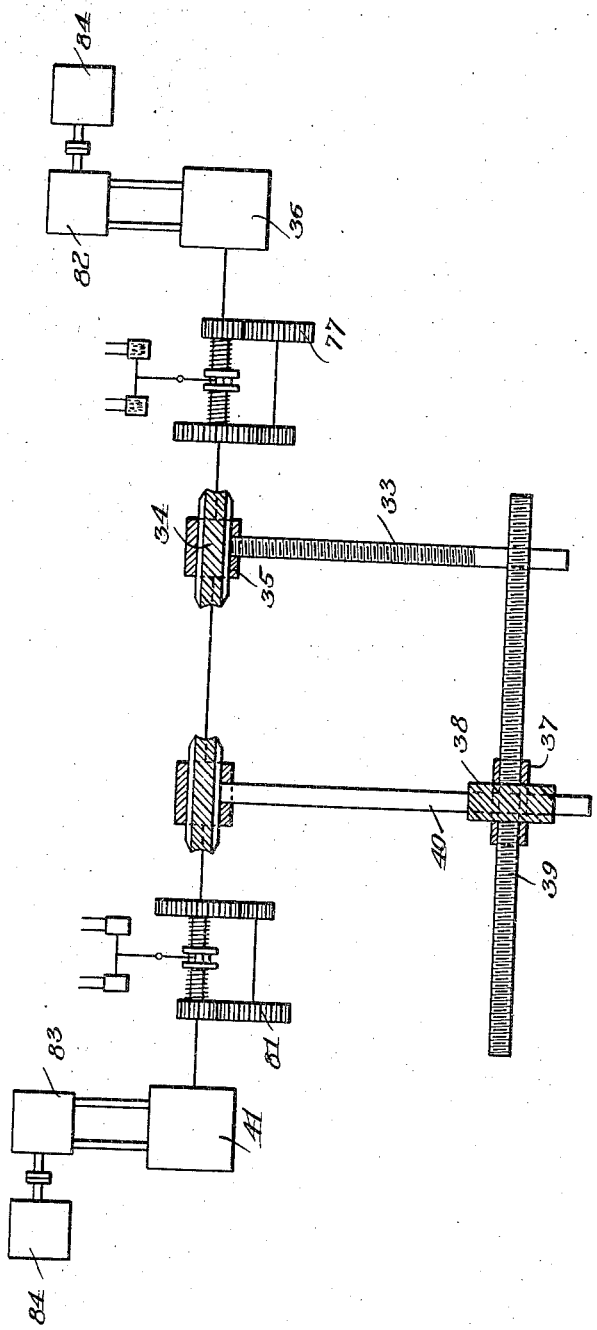

Patented Jan. 3, 1939

2,142,439

UNITED STATES PATENT OFFICE 2,142,439

MACHINE TOOL

Worthy J. F. Forward, Rochester, N. Y., assignor to Consolidated Machine Tool Corporation, Rochester, N. Y., a corporation of Delaware Application August 20, 1937, Serial No. 160,145

18 Claims. (Cl. 90—16)

This invention relates to a machine tool, and has to do more particularly with what is known as a profile milling machine in which a work piece is moved in an irregular path in any of four directions with reference to the cutter, and the structure is intended to enable accurate and ready control by the operator of the movements of the work piece when feeding through small distances, while also enabling continuous feeding or rapid traverse movements with the same mechanism.

One object of the invention is to provide mechanism for governing the movements of a work piece such that an operator may by moving a manually operated control member a given distance effect a predetermined feeding of the work piece through a given distance, movement of the work piece being automatically stoppd when it has traveled an amount determined by the distance through which the manually operated control member is moved, with the result that the operator can determine in advance and accurately govern movement of the work piece to a fine degree of thousandth parts of an inch.

Another purpose of the invention is to afford a construction that is applicable in a practical manner to a work table movable in either of two opposite directions and to a supporting saddle movable at right angles thereto in either of two opposite directions, so that movement of the work piece can be controlled by mechanism such as hereinbefore mentioned in any one of four directions, it being possible to effect such movements either independently or simultaneously through independent control of the saddle and table.

An additional object of the invention is to afford structure wherein the work support operates to restore an actuating member to normal or neutral position after the work support has traveled through a predetermined distance determined by the distance through which a control member is moved by the operator.

Still another purpose of the invention is to provide a construction of the general character described which is readily adapted to continuous feeding or to rapid traverse movements of a work piece.

A further objective of the invention is to provide mechanism that enables effecting all of the movements referred to in either of two directions at right angles to each other and feeding a work piece through the instrumentality of hydraulic mechanism.

In a more particular aspect, the invention contemplates the utilization of a screw and nut, one being turned by the operator through a manual control member and the other being connected to an actuating member which governs the hydraulic or other driving means while the nut and screw are mounted upon or operatively associated with the work support so that in addition to a rotating movement, they partake of an additional endwise movement bodily when the work support is fed, and in this fashion restore the actuating member to neutral position and stop the movement of the work support.

To these and other ends, the invention consists in the construction and arrangement of parts that will appear clearly from the following description when read in conjunction with the accompanying drawings, the novel features being pointed out in the claims following the specification.

In the drawings:

Fig. 2 is a side elevation of the same;

Fig. 3 is a rear elevation, with parts appearing in section;

Fig. 4 is an enlarged vertical sectional view on line 4—4 of Fig. 1, taken through the saddle, with parts broken away;

Fig. 5 is an enlarged vertical sectional view on the line 5—5 of Fig. 1 taken through the work table and saddle;

Fig. 6 is a transverse vertical sectional view on the line 6—6 of Fig. 2, taken through the nut and screw which are mounted upon the saddle;

Fig. 7 is a horizontal sectional view taken on the line 7—7 of Fig. 6;

Fig. 8 is a horizontal sectional view on the line 8—8 of Fig. 3;

Fig. 9 is an enlarged horizontal detail sectional view on the line 9—9 of Fig. 3;

Fig. 10 is a vertical sectional view on the line 10—10 of Fig. 8, and

Fig. 11 is a diagrammatic view of the drive.

Figure 1:
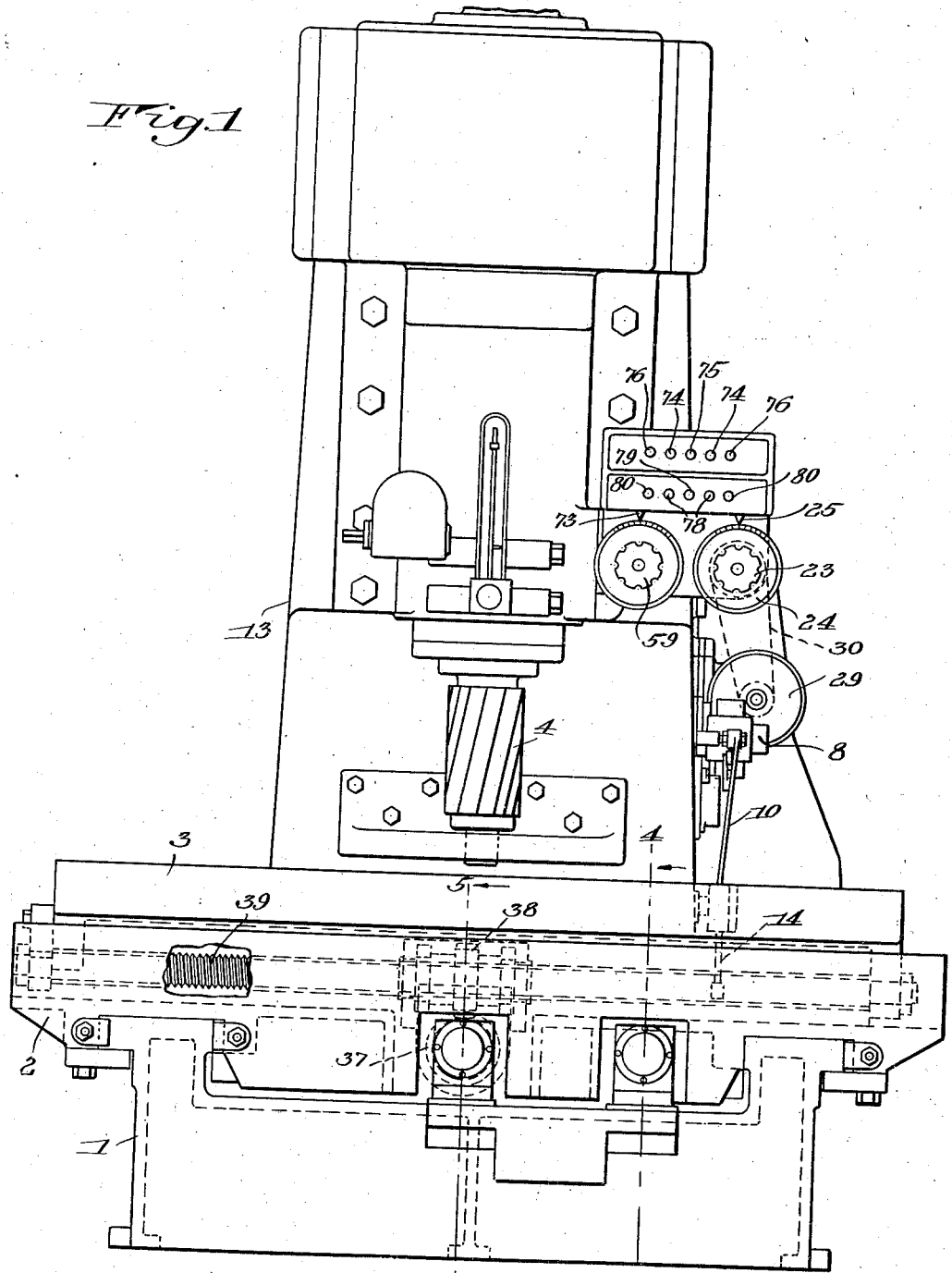
Fig. 1 is a view in front elevation of a profile milling machine built in accordance with one embodiment of the invention.

The invention is applicable to various types of machinery where it is desirable to control manually irregular movements of a work support or other element, and in the illustrated embodiment which is intended as an example of the invention, there is shown a metal working machine designed for profile milling, in which a work piece is adapted to be fed in either of four directions, although it will be apparent that the invention may be applied to other types of mechanism.

In the construction shown, and referring more particularly to the drawings in which like reference numerals refer to the same parts throughout the several views, 1 indicates a base, see Fig. 1, upon which is mounted for movement in and out a saddle 2, while 3 designates a work table mounted in ways on the saddle 2 and movable to the right or left thereon. 4 designates a profile milling cutter which is suitably mounted in the pedestal 5 and adapted to be driven by an electric motor 6.

The work piece, not shown, is secured to the work table 3 as usual in this class of machinery, and brought into operative relation with the cutter 4 by feeding movements of the table 3 to the right or left and movements of the saddle 2 in and out with reference to the cutter, these feeding movements of the work table and saddle being preferably effected by hydraulic motors, and the mechanism for controlling the movements of the saddle 2 will first be described, it being understood that the mechanism may be utilized to control any equivalent movable support.

The saddle 2 is operated in and out by a hydraulic motor governed by a suitable valve, the position of which is determined by an actuating member, as usual in the control of hydraulic motors, and the mechanism now to be described has to do with the control of said actuating member which through the valve and hydraulic motor effects movement of the saddle.

Referring to Fig. 2, the valve governing the hydraulic motor that operates the saddle is arranged within a housing designated generally at 8, and the valve has connected to it an actuating member in the form of a rod 9, the movement of which in one direction or the other is brought about by a lever 10, see Fig. 6, that is pivotally mounted at 12 on the housing 13 of the machine. The pivoted lever 10 carries a depending portion 14, see Fig. 7, located between the opposite portions 15 of a nut 16 which is threaded on a screw 17, the latter being mounted in suitable bearings in an extension fixedly mounted on the saddle 2 and movable therewith so that the screw 17 may rotate upon the saddle while at the same time it partakes of any in-and-out movement imparted to the saddle and travels therewith. The screw 17 is rotated by a shaft 18 which has a splined connection therewith, and the latter has fixed thereon at its rear end a sprocket wheel 19, see Figs. 2 and 3, driven by a chain 20 from a sprocket wheel 21 fixed upon the shaft 22 which is provided at its front end with a manual control member in the form of a hand wheel 23 and graduated dial 24 that cooperates with a stationary indicator 25 to show to the operator the extent of movement of the control member 23.

The parts are so related that when the operator manually turns the control member or hand wheel 23 through a distance of one graduation, or say one-eighth of an inch, it will result in a movement of the saddle such as to effect a cut of one-thousandth of an inch of stock from the work piece. It will be observed that when the hand wheel 23 is turned, it results in a corresponding turning of shaft 18, see Figs. 2, 6 and 7, screw 17, and consequent movement of the nut 16 endwise of the screw 17 and of the saddle. This movement of the nut causes a movement of lever 10 and of actuating member 9 which operates the valve of the hydraulic motor and sets the latter in motion to cause movement of the saddle through gearing that will be referred to later.

When the saddle is thus moved, its direction of movement is opposite to the previous direction of movement of the nut 16, with the result that as the saddle moves and carries with it the nut 16, it restores the latter to its initial position and likewise the lever 10 and actuating member, resulting in stopping movement of the saddle when it has traveled a distance corresponding to the distance through which the operator had turned the hand wheel 23. The nut 16 travels between the stationary arms 25 of a bracket 26, and 27 designates threaded posts which are adjustably mounted on the nut and constitute adjustable stops to limit the possible amount of movement of the nut in opposite directions with relation to the screw 17. 28 designates a cover plate secured to the saddle, see Fig. 6, and located over the nut 16 and screw 17.

The hand wheel 23 is movable in either direction depending upon the direction in which it is desired to move the saddle. When the screw 17 is turned in one direction, it moves the nut 16 bodily in one direction and likewise the actuating member 9 to the hydraulic control valve, and when the screw 17 is turned in the opposite direction, it moves the nut 16 bodily in the opposite direction and also the actuating member 9, resulting in an opposite movement of the saddle. Whichever direction the saddle is moved by the operator upon turning the hand wheel 23, its feeding movement causes a bodily endwise movement of the nut 16 and of the actuating member 9 oppositely to its initial movement and restores these parts to their normal position occupied when the saddle is idle.

If the shafts 22 and 18, and likewise screw 17, are turned continuously, the nut 16 is held in such position as to permit continuous movement of the saddle, and in order to effect such continuous movement of the saddle, a motor 29 is provided, see Fig. 2, which drives the shaft 22 through a chain or belt 30. The motor 29 is under the control of the operator, who starts it when it is desirable to effect a continuous feeding movement of the saddle instead of an intermittent movement as previously described, and such continuous feed may be stopped at any instant by stopping the motor 29. Suitable means is provided to cut in resistance automatically after the motor 29 is started, so that a high torque is available to permit quick starting and a low torque for running. This may be accomplished by providing the actuating member 9 with a suitable arm which is engageable with one of the oppositely arranged switch elements 31 that control resistance in the circuit of motor 29.

To drive the saddle, a nut 32 is mounted on it, see Fig. 4, and is engaged by a screw 33 which carries a worm gear 34 operated by a worm 35, the latter being driven from the hydraulic motor 36 that is controlled through a suitable valve by the actuating member 9 previously described. It will be understood that the hydraulic motor and valve control are of conventional construction and form no part of this invention, which has to do with the control of the actuating member that moves the valve and which is restored to its normal position by the movement of the saddle.

The work table 3 is driven to the right or left by a worm 37, see Fig. 5, which actuates a worm gear 38, the latter being interiorly threaded and operating a screw 39 that is carried by the work table, see Figs. 1 and 5. The worm 37 and worm gear 38 are mounted on the saddle, and worm gear 37 is slidably keyed on the shaft 40 which is driven from a hydraulic motor 41 through gearing similar to that which operates the saddle, see Fig. 11.

The hydraulic motor 41 is governed by a valve that is controlled to effect intermittent or continuous feeding movements of the table, similarly to the saddle already described, and the mechanism for effecting such movement of the work table will now be described.

The actuating member for the hydraulic valve controlling motor 41 and the work table is designated at 45, see Fig. 3, the housing for the hydraulic valve at 46, and the lever which controls the actuating member at 47. The lever 47 is pivoted at 48 upon a suitable supporting post and carries an arm 49 positionable between opposite portions 50 of a nut 51, see Figs. 8 and 9, which is rotatably engaged with a screw 52 that is journalled in bearings mounted on a supporting plate 53 that is movable vertically for a purpose that will appear later. The screw 52 has a splined connection with a shaft 53, see Fig. 2, that carries a bevel gear 54 engaged and driven by a bevel pinion 55 mounted upon an arbor 56, and the latter is driven by a chain 57 from a shaft 58 that in turn carries a hand wheel 59, see Fig. 1, by which the intermittent feeding movements of the work table to the right or left are governed by the operator.

Whereas in the case of the saddle, the screw that controls the nut is mounted on the saddle itself, the screw 52 that controls nut 51 is mounted upon the plate 53 that is operatively connected with the work table so as to move bodily in a direction and to an extent corresponding to the work table, and thereby to move the nut 50 bodily and restore the actuating member to its initial or normal position. To effect this result, the vertical plate 53, which supports the worm 52 and nut 51, is movable vertically in guideways 61 of a bracket 62 fixedly mounted on the frame of the machine. The vertically movable plate 53 carries a vertical rack 63 that is engaged and operated by a pinion 64 carried by shaft 65, see Figs. 9 and 10, which has a splined connection with the tubular shaft 66 carried by the saddle and carrying at its forward end a pinion 67 that engages a rack 68 fixedly mounted upon the work table.

When the operator turns hand wheel 59, see Fig. 1, it causes movement of actuating member 45, see Fig. 3, through the screw, nut and operating lever already described, and the hydraulic valve being thus operated, the work table is moved in a direction and to an extent determined by the movement of the hand wheel or control member. As the work table moves, it turns pinion 67 through rack 68 carried by the work table, see Fig. 10, and thus moves rack 63 and plate 53 upwardly or downwardly, carrying with it the worm 52 and nut 51, the latter during such bodily movement traveling in a direction opposite to its movement when rotating, and thus restoring the lever 47, actuating member 45, and the hydraulic controlling valve to their initial or normal positions and stopping movement of the table after it has traveled a distance corresponding to the distance through which the control member or hand wheel is turned.

To effect continuous feeding of the work table, when desired, an electric motor 69 is provided, see Fig. 2, which is connected through a chain 70 with the aforementioned arbor 56, so that when the motor 69 is operated, arbor 53 and screw 52 are turned continuously and bring about continuous feeding of the work table. 71 designate adjustable stops, see Fig. 3, mounted upon the nut 51 and cooperating with stationary arms 72 to limit endwise movements of the nut.

With the structure thus far described, the operator may by turning control member 23, or control member 59, or both, through given distances, move the saddle in or out, or move the work table to the right or left, or effect both movements simultaneously, and thus cause the work to travel to any desired extent and in any direction in a horizontal plane with reference to the tool. Either the saddle, or work table, or both, may be fed continuously by operating the electric motors 29 and 69 hereinbefore described. The latter are under the control of suitable electric switches appearing in Fig. 1. 73 is an indicator cooperating with a dial fixedly connected to the hand wheel 59 for showing the extent of movement of the latter, and 74 indicate switches for controlling the motor 29 and imparting continuous feed to the saddle in one direction or the other. The center switch 75 is employed for opening the motor circuit just referred to in order to stop continuous feeding after one or the other of the switches 74 has been operated, while 76 designate switches for effecting rapid traverse of the saddle in one direction or the other, such rapid traverse movements being brought about by operating the electric motor already referred to, and at the same time throwing in the change speed gears indicated diagrammatically at 77 in Fig. 11 to bring about a fast return movement of the saddle when desired.

Similar switches 78 control the movements of the table in opposite directions when feeding continuously through the electric motor 69, see Fig. 2, while 79 is a switch for opening the same motor circuit, and 80 are switches for effecting rapid traverse movements of the table in opposite directions, the faster movement of the table being brought about by the change gears 81, see Fig. 11.

The hydraulic motor 36 which operates the saddle is supplied from a fluid pump 82, see Fig. 11, and the hydraulic motor 41 is supplied from a fluid pump 83. Said fluid pumps may be driven from independent electric motors 84 or both may be operated by the same motor, but the invention is not confined in its application to a structure in which the saddle and table are operated by fluid motors since it is within the province of the invention to apply to electric or other types of drive the principle of a manual control or setting which initiates movement of a work piece support through a rotating nut or equivalent device, which latter is moved bodily as the work piece support travels and thereby restores the operating parts to normal or idle position. Such construction enables the operator to feed work in any direction and for any desired amount down to thousandth parts of an inch or less so that the operator may by his eye accurately follow a given pattern, and at the same time the mechanism permits any desired continuous feeding movements of the work piece as well as the necessary rapid traverse movements, all in a manner that is readily within the control of the operator and through mechanism that is comparatively simple in design.

While the invention has been disclosed with reference to certain details of construction, it is not limited to the arrangements shown, and this application is intended to cover any modifications or departures coming within the purposes of the improvements or the scope of the following claims.

I claim:

1. The combination with a support and an actuating member for starting and stopping movement of the support, of mechanism for controlling said actuating member comprising a rotary screw, a nut engaging said screw, the nut being operatively connected to said actuating member and the screw and nut being connected to the support for endwise movement therewith, and manually operated means for turning said screw.

2. The combination with a stationary part, of a support and a movable actuating member mounted on said stationary part for starting and stopping movement of the support, mechanism for controlling said actuating member comprising a rotary screw mounted on the support and movable therewith, a nut engaging said screw, the nut being operatively connected to said actuating member, and manually operated means for turning said screw.

3. The combination with a stationary part, of a support, manually operated means on said stationary part for starting movement of the support, said means being operatively connected with the support whereby it is restored to initial position after the support has traveled a predetermined distance.

4. The combination with a stationary part, of a support, a manually operated means on said stationary part for effecting movement of the support, said manually operated means including a control member that is adjustably positionable with relation to the support and controlled thereby to predetermine the extent of movement of the support.

5. The combination with a stationary part, of a support and a movable actuating member mounted on said stationary part for starting and stopping movement of the support, mechanism for controlling said actuating member comprising a rotary screw, a nut engaging said screw, one of said parts being operatively connected to said actuating member, and manually operated means for turning the other of said parts, the former of said parts being operatively connected to the support and movable thereby whereby it is restored to neutral position by movement of the support.

6. The combination with a stationary part, of a support and a movable actuating member mounted on said stationary part for starting and stopping movement of the support, mechanism for controlling said actuating member comprising a rotary screw, one of said parts being operatively connected to said actuating member, a nut engaging said screw, the nut and screw being connected to the support and movable endwise in accord with movements of the support, and manually operated means for turning the nut and screw relatively.

7. The combination with a saddle movable in opposite directions, an actuating member for starting and stopping movement of the saddle, a rotary screw mounted on the saddle, a nut engaging said screw and operatively connected to said actuating member, manually operated means for turning said screw, a work table mounted on the saddle for movement in opposite directions at right angles thereto, an actuating member for starting and stopping movements of the work table, a rotary screw, a nut engaging said screw and operatively connected to the last mentioned actuating member, operative connections between the work table and the last mentioned screw for moving the latter endwise when the table is moved, and manually operated means for turning the last mentioned screw.

8. The combination with a support, a hydraulic motor for moving the support, and a valve actuating member governing said hydraulic motor, of mechanism for controlling said valve actuating member comprising a rotary screw, a nut engaging said screw, the nut being operatively connected to said valve actuating member and the screw and nut being connected to the support for endwise movement therewith, and manually operated means for turning said screw.

9. The combination with a stationary part, of a support, a hydraulic motor for moving the support, and a valve actuating member mounted on said stationary part for governing said hydraulic motor, of mechanism for controlling said valve actuating member comprising a rotary screw mounted on the support and movable therewith, a nut engaging said screw, the nut being operatively connected to said valve actuating member and operating the latter in opposite directions, and manually operated means for turning said screw.

10. The combination with a stationary part, of a support, a hydraulic motor for moving the support, and a valve actuating member mounted on said stationary part for governing said hydraulic motor, of manually operated means for operating the valve actuating member and including an element mounted on the support and connected to said valve actuating member, said element being automatically actuated to stop the support after the latter has traveled a distance determined by the extent of movement of said manually operated means.

11. The combination with a stationary part, of a support, a hydraulic motor for moving the support, and a valve actuating member mounted on said stationary part for governing said hydraulic motor, of mechanism for controlling said valve actuating member comprising a rotary screw, a nut engaging said screw, the nut being operatively connected to the valve actuating member, and manually operated means for turning said screw, the nut being movable with the support and restored to neutral position by movement of said support.

12. The combination with a stationary part, of a support, a hydraulic motor for moving the support, and a valve actuating member mounted on said stationary part for governing said hydraulic motor, of mechanism for controlling said valve actuating member comprising a rotary screw, a nut engaging said screw, one of said parts being operatively connected to said valve actuating member and movable with the support, and manually operated means for turning the other of said parts, the former of said parts being restored to neutral position by movement of the support.

13. The combination with a stationary part, of a movable support, a movable actuating member mounted on said stationary part for starting and stopping movement of the support, manually operated means connected to said actuating member and operable to move the same to start movement of the support, said manually operated means being operably connected with the support and movable therewith whereby the movement of the support acts to restore said actuating member to normal position.

14. The combination with a stationary part, of a movable support, a movable actuating member mounted on said stationary part for starting and stopping movement of the support, manually operated means connected to said actuating member and operable to start movement of the support, said manually operated means being connected with the support and movable therewith whereby it is restored to initial position and is moved varying distances to effect movement of the support a predetermined amount.

15. The combination with a stationary part, of a movable support, a movable actuating member mounted on said stationary part for starting and stopping movement of the support, mechanism for moving said actuating member to start movement of the support comprising a rotary screw, a nut engaging said screw, the nut being connected to said actuating member, and manually operated means for turning said screw, the nut being operatively connected to the support and movable thereby whereby it is restored to neutral position by movement of the support.

16. The combination with a stationary part, of a movable support, a hydraulic motor for moving the support, and a valve actuating member mounted on said stationary part for governing said hydraulic motor, of manually operated means connected to the valve actuating member and operable to start movement of the support, said manually operated means including an element connected to and movable with the support whereby movement of the support acts to restore said valve actuating member to normal position.

17. The combination with a stationary part, of a movable support, a hydraulic motor for moving the support, and a valve actuating member mounted on said stationary part for governing said hydraulic motor, of manually operated means connected to said valve actuating member and operable to move the same to start movement of the support, said manually operated means including an element mounted on the support whereby the support acts automatically to restore said valve actuating member to initial position.

18. The combination with a stationary part, of a movable support, a hydraulic motor for moving the support, and a valve actuating member mounted on said stationary part for governing said hydraulic motor, of manually operated means connected to said valve actuating member for starting movement of the support, said manually operated means including a control member that is adjustably positionable on the support to predetermine the extent of movement of the support.

WORTHY J. F. FORWARD.